(12) United States Patent
Knittel et al.

(10) Patent No.: US 9,664,545 B2
(45) Date of Patent: May 30, 2017

(54) AIR MASS SENSOR

(71) Applicant: CONTINENTAL AUTOMOTIVE GMBH, Hannover (DE)

(72) Inventors: Thorsten Knittel, Pentling (DE); Stephen Setescak, Pentling (DE)

(73) Assignee: Continental Automotive GmbH, Hannover (DE)

( * ) Notice: Subject to any disclaimer, the term of this patent is extended or adjusted under 35 U.S.C. 154(b) by 74 days.

(21) Appl. No.: 14/437,744

(22) PCT Filed: Sep. 24, 2013

(86) PCT No.: PCT/EP2013/069805
§ 371 (c)(1),
(2) Date: Apr. 22, 2015

(87) PCT Pub. No.: WO2014/063884
PCT Pub. Date: May 1, 2014

(65) Prior Publication Data
US 2015/0292929 A1    Oct. 15, 2015

(30) Foreign Application Priority Data
Oct. 23, 2012 (DE) .................. 10 2012 219 304

(51) Int. Cl.
*G01F 1/684* (2006.01)
*G01F 1/688* (2006.01)
(Continued)

(52) U.S. Cl.
CPC .......... *G01F 1/6845* (2013.01); *G01F 1/6888* (2013.01); *F02D 41/18* (2013.01); *G01F 1/692* (2013.01)

(58) Field of Classification Search
CPC ........ G01F 15/02; G01F 1/684; G01F 1/6845; G01F 1/692; G01F 1/696; G01F 5/00; G01F 1/6888
See application file for complete search history.

(56) References Cited

U.S. PATENT DOCUMENTS 5,703,288 A   12/1997   Horiguchi et al.
6,134,960 A   10/2000   Yamakawa et al.
(Continued)

FOREIGN PATENT DOCUMENTS

CN   1459020   11/2003
CN   1755332   4/2006
(Continued)

OTHER PUBLICATIONS

Office Action dated Mar. 1, 2017 which issued in the corresponding Chinese Patent Application No. 201380055278.2.

*Primary Examiner* — Francis Gray
(74) *Attorney, Agent, or Firm* — Cozen O'Connor

(57) ABSTRACT

An air mass sensor includes a microelectromechanical-type sensor element having a heating element. A first temperature sensor element is arranged on the sensor element upstream of the heating element, and a second temperature sensor element is arranged on the sensor element downstream of the heating element. The first temperature sensor element has a first width and a first length, and the second temperature sensor element has a second width and a second length. To eliminate or closely limit false measurement results due to the presence of dirt on the sensor element, the first width of the first temperature sensor element is greater than the second width of the second temperature sensor element.

9 Claims, 6 Drawing Sheets

(51) Int. Cl.
*G01F 1/692* (2006.01)
*F02D 41/18* (2006.01)

(56) References Cited

U.S. PATENT DOCUMENTS

| | | | |
|---|---|---|---|
| 6,745,625 B2 | 6/2004 | Ariyoshi | |
| 6,845,660 B2 | 1/2005 | Hecht et al. | |
| 6,865,938 B2 | 3/2005 | Pesahl et al. | |
| 6,871,534 B1 * | 3/2005 | Hamada | F02D 41/185 73/202.5 |
| 7,287,424 B2 | 10/2007 | Matsumoto et al. | |
| 7,624,633 B2 | 12/2009 | Nakada et al. | |
| 7,647,825 B2 | 1/2010 | Nakano et al. | |
| 7,650,784 B2 * | 1/2010 | Watanabe | G01F 1/6842 73/204.26 |
| 8,784,367 B2 | 7/2014 | Dekker et al. | |
| 2002/0100316 A1 * | 8/2002 | James | G01F 1/6845 73/204.26 |
| 2003/0154807 A1 | 8/2003 | Hecht et al. | |
| 2006/0037390 A1 * | 2/2006 | Nakano | G01F 25/0007 73/204.21 |
| 2006/0065049 A1 * | 3/2006 | Nakada | G01F 1/6842 73/204.26 |
| 2006/0162442 A1 * | 7/2006 | Matsumoto | G01F 5/00 73/204.15 |
| 2007/0209433 A1 | 9/2007 | Gehman et al. | |
| 2008/0245145 A1 * | 10/2008 | Mayer | G01F 1/6845 73/204.26 |
| 2011/0107832 A1 * | 5/2011 | Sakuma | G01F 1/6842 73/204.26 |

FOREIGN PATENT DOCUMENTS

| | | |
|---|---|---|
| CN | 101443635 | 5/2009 |
| CN | 101551261 | 10/2009 |
| CN | 202494482 | 10/2012 |
| DE | 4407209 A1 | 9/1995 |
| DE | 10111840 A1 | 10/2002 |
| EP | 1227326 A2 | 7/2002 |
| EP | 1426740 A2 | 6/2004 |
| EP | 1686354 A2 | 8/2006 |
| EP | 2107348 A2 | 10/2009 |
| JP | 11-201793 | 7/1999 |
| JP | 2003-315131 | 11/2003 |
| JP | 2006-208112 | 8/2006 |
| JP | 2011-527749 | 11/2011 |
| WO | WO 03089884 A1 | 10/2003 |

* cited by examiner

AIR MASS SENSOR

CROSS-REFERENCE TO RELATED APPLICATIONS

This is a U.S. national stage of application No. PCT/EP2013/069805, filed on 24 Sep. 2013, which claims priority to the German Application No. DE 10 2012 219 304.9 filed 23 Oct. 2012, the content of both incorporated herein by reference.

BACKGROUND OF THE INVENTION

1. Field of the Invention

The invention relates to an air mass meter having a sensor element of microelectromechanical design.

2. Related Art

Air mass meters (i.e., sensors) are used, for example, in motor vehicles for determining the air mass sucked in by an internal combustion engine. Combustion can be optimized on the basis of the most reliable possible information about a sucked-in air mass by electronic control of the internal combustion engine, to the effect that a quantity of fuel which is matched precisely to the air mass is fed to the respective combustion chambers. As a result, better utilization of energy with reduced emission of pollutants is achieved.

DE 44 07 209 A1 discloses an air mass meter plugged into an intake duct for determining an air mass, wherein a defined proportion of the total flow flows through the air mass sensor.

For this purpose, the latter is embodied as a plug-in duct air mass meter. The air mass meter comprises a sensor element arranged in a measuring duct, electronics arranged in a housing for evaluating and/or detecting the measured values of the sensor element, and an outlet duct on the other side of the sensor element. For a space-saving arrangement, the specified ducts or air guiding paths are embodied in the form of a U, S or C, with the result that a device that is compact overall and is embodied as a plug-in element is formed.

An air mass meter embodied according to the teaching of WO 03/089884 A1 and embodied as a hot-film anemometer has in principle proven valuable.

During the development of modern air mass meters that operate on the basis of sensor elements embodied as microelectromechanical systems (MEMS) it has become apparent that the measurement results of the sensor elements are influenced in a particularly disadvantageous way by contamination. Contamination, caused, for example, by oil droplets in the air mass flow, results over time in a signal drift in the sensor element, which signal drift can lead to incorrect measured values for the air mass flow. However, sensor elements embodied as microelectromechanical systems have a multiplicity of advantages which should not be dispensed with.

SUMMARY OF THE INVENTION

Therefore an object of the invention is to eliminate the falsification of the measurement results by the contamination of the sensor element or at least to keep it within tight limits.

According to an aspect of the invention, this object is achieved in that the first width of the first temperature sensor element is greater than the second width of the second temperature sensor element. This has the advantage that contamination is hardly deposited in the edge region of the small width of the second temperature sensor element.

In one development of the invention, the second length of the second temperature sensor element is greater than the first length of the first temperature sensor element. This development permits the faces of the temperature sensor elements to be adapted to one another, as a result of which the signal quality of the air mass meter can be decisively improved.

For this purpose it is advantageous if the first width of the first temperature sensor element is at least 10% greater than the second width of the second temperature sensor element, and the second length of the second temperature sensor element is at least 10% greater than the first length of the first temperature sensor element.

Within the scope of one refinement of the invention, the first width of the first temperature sensor element is at least 30% greater than the second width of the second temperature sensor element, and the second length of the second temperature sensor element is at least 30% greater than the first length of the first temperature sensor element.

In a further refinement, the first width of the first temperature sensor element is at least 50% greater than the second width of the second temperature sensor element, and the second length of the second temperature sensor element is at least 50% greater than the first length of the first temperature sensor element.

In one development, the product of the first width and of the first length of the first temperature sensor element is equal to the product of the second width and of the second length of the second temperature sensor element. This permits the most uniform possible signal strength of the first temperature sensor element and of the second temperature sensor element to be achieved.

BRIEF DESCRIPTION OF THE DRAWINGS

Further features and advantages of the invention are specified below with the description of an exemplary embodiment with reference to the figures in the drawings. The same terms and reference symbols are used for the same components in the various figures below. In the drawings.

DETAILED DESCRIPTION OF THE PRESENTLY PREFERRED EMBODIMENTS

Figure 1:
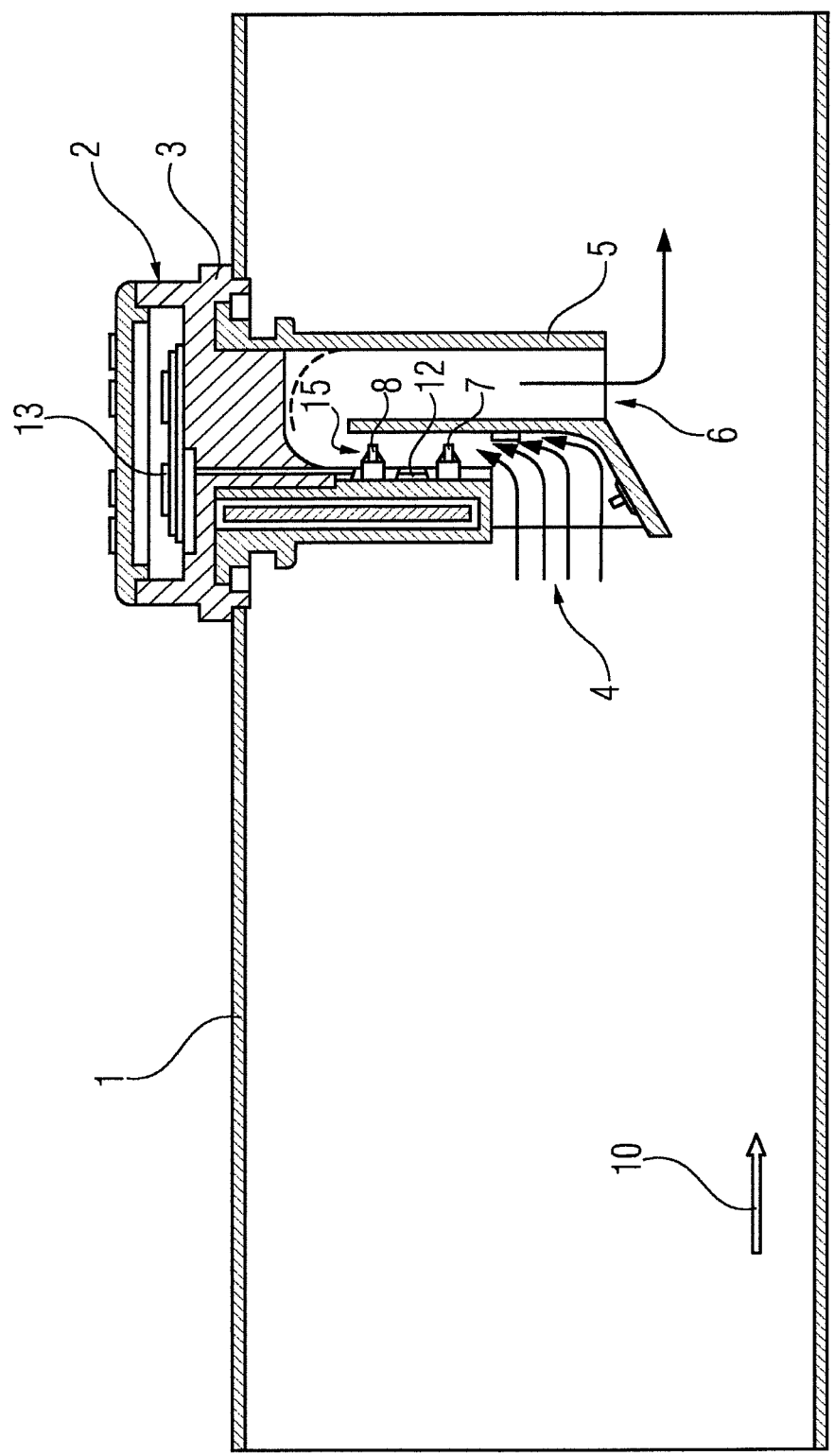
FIG. 1 shows an air mass meter.

FIG. 1 shows a mass flow sensor embodied here as an air mass meter 2. The air mass meter 2 is shown in this example as a plug-in finger that is plugged into an intake pipe 1 and is fixedly connected to the intake pipe 1. The intake pipe 1 conducts a mass flow, which is an air mass flow 10 here, to the cylinders of an internal combustion engine. In order to burn the fuel in the cylinders of an internal combustion engine efficiently, it is necessary to obtain precise information about the available air mass. On the basis of the available air mass it is possible to infer the available oxygen necessary to burn the fuel injected into the cylinders. Furthermore, the air mass meter 2 in FIG. 1 shows a first temperature sensor element 7 and a second temperature sensor element 8. The first temperature sensor element 7 and the second temperature sensor element 8 are arranged at different locations. The temperature sensor elements 7, 8 are generally formed from resistors or thermopiles which adopt different resistance values in accordance with the temperature prevailing at the respective temperature sensor element. A heating element 12 is formed between the first temperature sensor element 7 and the second temperature element 8. The part of the air mass flow 10 which enters the housing 3 of the air mass meter 2 through the inlet opening 4 firstly flows over the first temperature sensor element 7 and then the heating element 12, after which the air mass flow 10 reaches the second temperature sensor element 8 and is directed along the auxiliary pipe 5 to the outlet opening 6 of the air mass meter 2. The air mass flow 10 reaches the first temperature sensor element 7 at a specific temperature. This temperature is detected by the first temperature sensor element 7 as an absolute temperature. The air mass flow 10 then passes over the heating element 12, wherein the air mass flow 10 is heated up to a greater or lesser extent depending on the mass flowing past. When the heated air mass flow reaches the second temperature sensor element 8, the temperature of the air mass flow 10 then present is determined with the second temperature sensor element 8 as an absolute temperature. The air mass that has flowed past can be determined from the difference between the absolute temperature measured by the first temperature sensor element 7 and the absolute temperature measured by the second temperature sensor element 8. For this purpose, the air mass meter 2 itself can include evaluation electronics 13, which evaluate the measurement signals of the first temperature sensor element 7 and of the second temperature sensor element 8. The information acquired in this way about the air mass flow 10 is passed on to an engine controller (not illustrated here).

It is to be noted that the invention is described by way of example with reference to an air mass meter, but this does not mean a restriction of the invention to the measurement of air mass flows. Other mass flows can also advantageously be detected and measured with the device according to the invention.

For example it is conceivable to measure the mass flow of a hydrocarbon connection in a purging line of a hydrocarbon tank with the device according to the invention.

Figure 2:
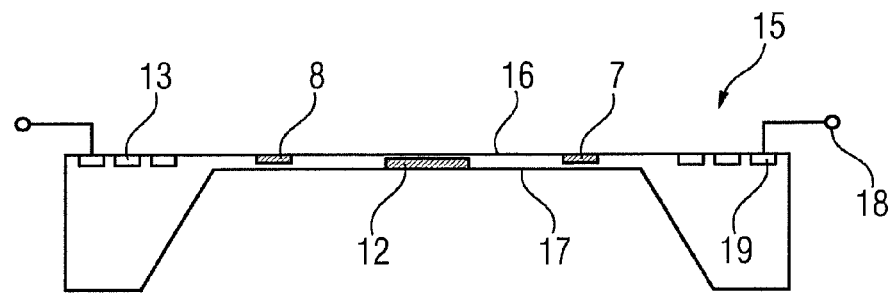
FIG. 2 shows a sensor element embodied as a microelectromechanical system (MEMS)

FIG. 2 shows a sensor element 15 for an air mass meter 1. The sensor element 15 is embodied as a microelectromechanical system (MEMS) on a single silicon chip. The sensor element 15 operates according to the differential temperature method, with which the mass of the quantity 10 of air flowing past is determined. For this purpose, a first temperature sensor element 7 and a second temperature sensor element 8 are embodied on a thin diaphragm 17. The first and the second temperature sensor element 7, 8 are situated at different locations on the surface 16 of the diaphragm 17. A heating element 12 is arranged between the first temperature sensor element 7 and the second temperature sensor element 8. In addition, evaluation electronics 13, which can immediately evaluate the measurement signals of the temperature sensor elements 7, 8 and convert them into a signal proportional to the air mass flow 10, are integrated into the sensor element 15, which is constructed as a microelectromechanical system. The evaluation electronics 13 can, however, equally well be integrated into a downstream electronic device. The information about the air mass flow 10 is then passed on via connecting pads 19 and connecting wires 18 to a downstream electronic engine controller (not illustrated here).

Figure 3:
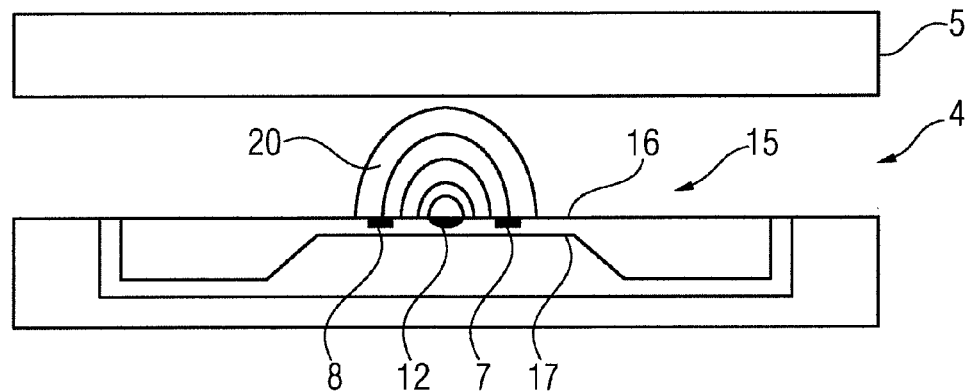
FIG. 3 shows a sensor element embodied as a microelectromechanical system (MEMS) and is arranged in an auxiliary pipe of the air mass meter.

FIG. 3 shows a sensor element 15, embodied as a microelectromechanical system (MEMS), for an air mass meter 2 embodied on a single substrate, wherein the substrate is arranged in an auxiliary pipe 5 of the air mass meter 2. In FIG. 3, no air mass flow 10 flows through the inlet opening 4, which will be the case, for example, when the internal combustion engine is switched off. This state is also referred to as a zero mass flow. When the heating element 12 on the sensor element 15 is supplied with electrical energy, the symmetrical temperature distribution 20 illustrated here occurs around the heating element 12. Therefore, the first temperature sensor element 7 and the second temperature sensor element 8 measure the same absolute temperature, and after the formation of differences between the temperature measurement signals of the temperature sensor elements 7, 8, the evaluation electronics 13 detect that no air mass flow 10 is present in the auxiliary pipe 5 of the air mass meter 2. However, this ideal equality between the temperature measurement signals in the case of a zero mass flow can be disrupted, for example, by contamination on the sensor element 15.

Figure 4:
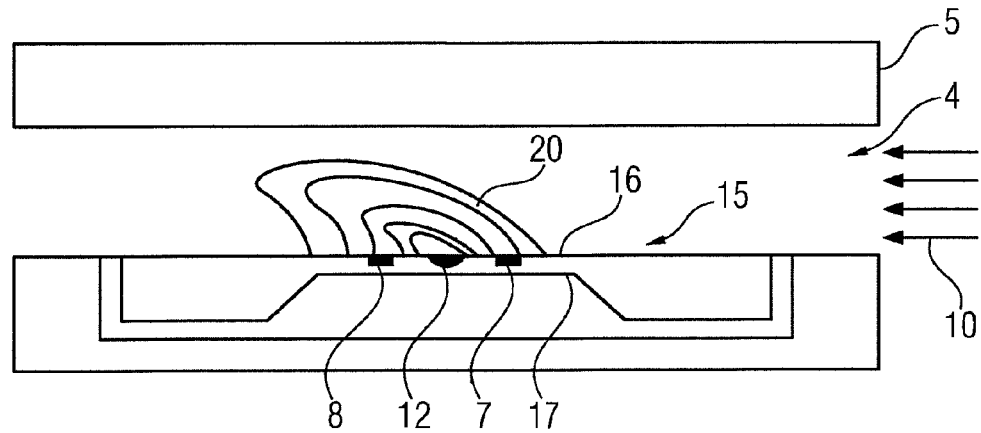
FIG. 4 shows a situation in which the air mass flow flows through the inlet opening into the auxiliary pipe of the air mass meter.

FIG. 4 shows a situation in which an air mass flow 10 flows into the auxiliary pipe 5 of the air mass meter 2 through the inlet opening 4. The temperature distribution 20 around the heating element 12 is now clearly visibly shifted in the direction of the second temperature sensor element 8. The second temperature sensor element 8 therefore measures a significantly higher temperature than the first temperature sensor element 7. The air mass flow 10 can then be determined by the detection of the difference in temperature between the two temperature sensor elements 7, 8 in the evaluation electronics 13. However, the influences of contamination on the sensor element would continue to be effective and they would be superimposed on the measurement results. The sum of the temperatures likewise reacts on the mass flow 10. However, the sum of the temperatures furthermore also reacts on the thermal properties of the air mass, such as for example the thermal capacity and/or the thermal conductivity of the air mass flow 10 flowing past. If, for example, the thermal conductivity of the air mass increases with the same air mass flow 10, the system cools down and the sum of the temperatures becomes significantly lower. The difference in temperature between the first temperature sensor element 7 and the second temperature sensor element 8 remains, however, unchanged in a first approximation. Therefore, by the sum signal of the first temperature sensor element 7 and of the second temperature sensor element 8 it is possible to measure a change in the thermal properties such as, for example, the thermal capacity or the thermal conductivity of the air mass. If the differential temperature signal is then set off against the sum temperature signal, the changed thermal conductivity and/or the changed thermal capacity of the air mass flowing past can be inferred.

Figure 5:
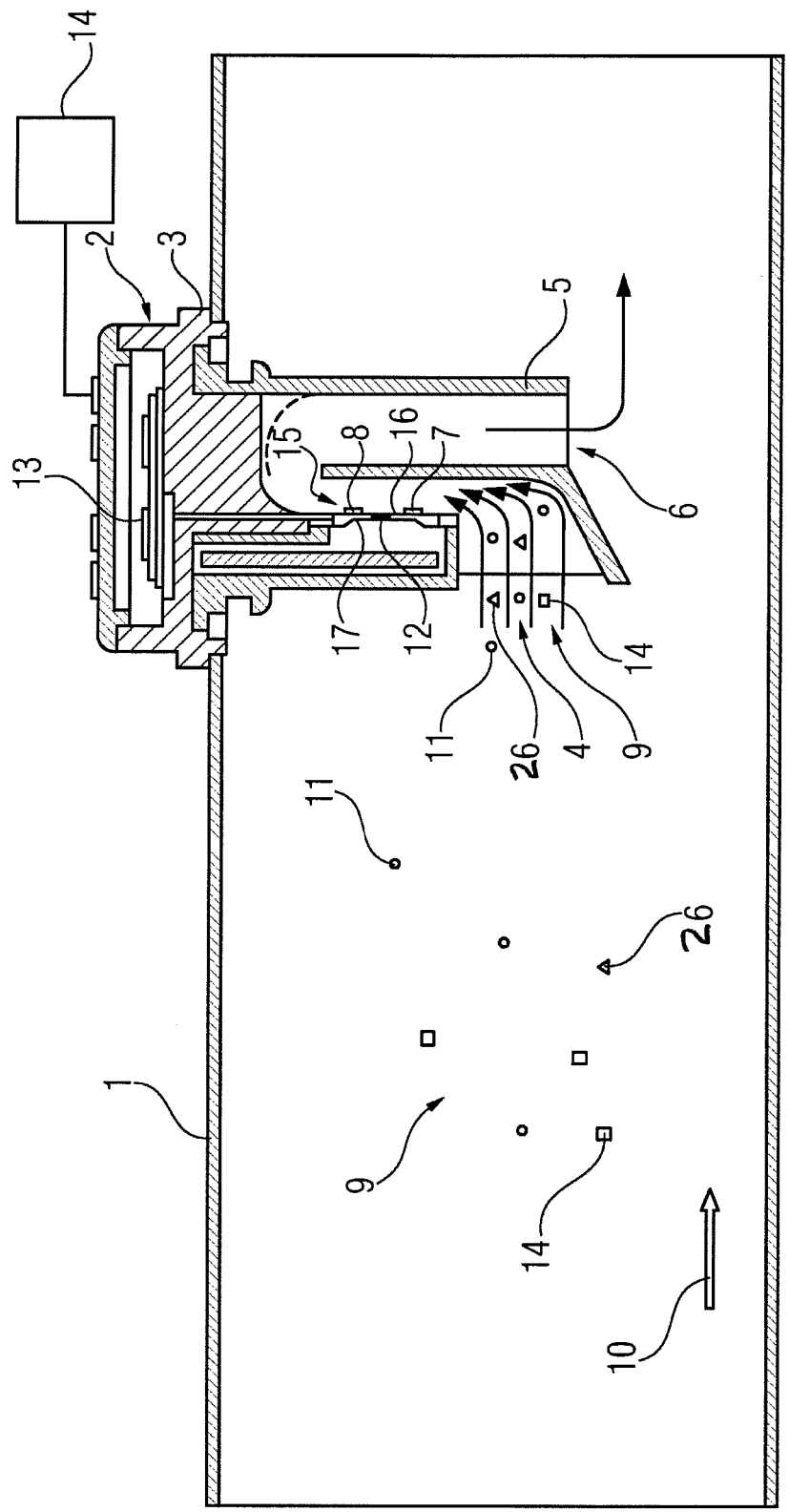
FIG. 5 shows the sensor element embodied as a microelectromechanical system (MEMS) in an air mass meter integrated as a plug-in finger into an intake pipe.

FIG. 5 shows the sensor element 15 of the air mass meter that is embodied as a microelectromechanical system (MEMS) in an air mass meter 2, which is integrated as a plug-in finger in an intake pipe 1. The air mass flow 10 also reaches the inlet opening 4 here and enters the auxiliary pipe 5. On the surface 16 of the diaphragm 17, the first temperature sensor element 7 and the second temperature sensor element 8 can be seen. The heating element 12 is arranged between the first temperature sensor element 7 and the second temperature sensor element 8. The air mass flow 10 firstly reaches the first temperature sensor element 7, then flows over the heating element 12 in order then to reach the second temperature sensor element 8.

FIG. 5 shows that the air mass flow 10 also includes contamination 9. For example water droplets 26, oil droplets 11 and/or particles of dust 14 are transported by the air mass flow 10 to the air mass meter 2. The contamination 9 passes through the inlet opening 4 of the air mass meter 2 to the sensor element 15. If the contamination is deposited in the region of the first temperature sensor element 7 and the second temperature sensor element 8, a massive falsification of the measured value for the air mass flow 10 can occur over time. Since this falsification builds up increasingly as a result of the accumulation of the contamination on the sensor element 15 over a long time period, in this context the term signal drift of the air mass meter 2 is also used. This signal drift is undesired and it should be suppressed and/or compensated.

Figure 6:
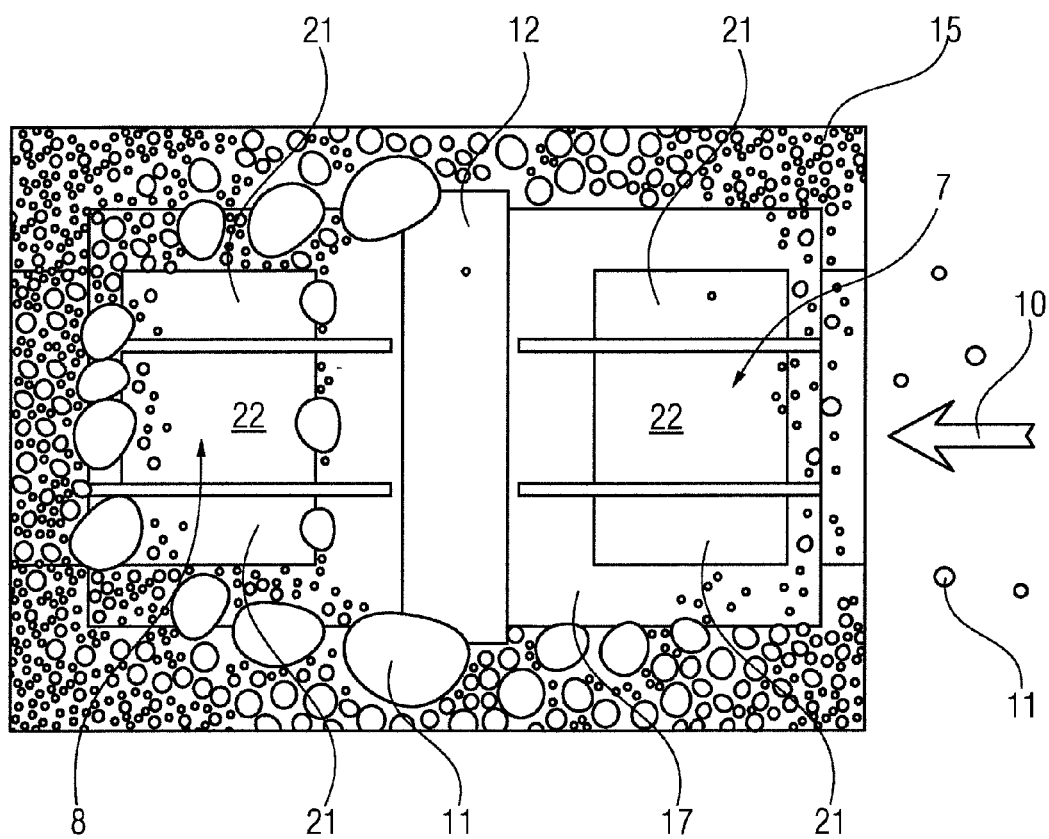
FIG. 6 shows the sensor element with the first temperature sensor element and the second temperature sensor element.

FIG. 6 shows the sensor element 15 with the first temperature sensor element 7 and the second temperature sensor element 8 as well as the heating element 12 arranged between the temperature sensor elements 7 and 8. The direction of the air mass flow 10 is illustrated with the arrow. Therefore, in the flow of the air mass flow 10 the first temperature sensor element 7 is arranged upstream of the heating element 12 and the second temperature sensor element 8 as well as the heating element 12 arranged between the temperature sensor elements 7 and 8. The direction of the air mass flow 10 is illustrated with the arrows. Therefore, in the flow direction of the air mass flow 10 the first temperature sensor element 7 is arranged upstream of the heating element 12 and the second temperature sensor element 8 is arranged downstream of the heating element 12. Both the first temperature sensor element 7 and the second temperature sensor element 8 are composed in this example as electrical series circuits comprising a measuring resistor 22 and at least two comparison resistors 21. It is apparent that the measuring resistors 22 are arranged in the inner region of the thin diaphragm, and the comparison resistors 21 are arranged in the edge region of the diaphragm 17.

Furthermore, FIG. 6 shows that contamination 9, and in this context predominantly oil droplets 11, are transported with the mass flow 10 to the sensor element 15. In particular, the oil droplets 11 are deposited on the sensor element 15. It is clearly apparent that the depositing of the oil droplets 11 on the sensor element 15 takes place to a particularly pronounced degree in the region of the second sensor element 8, which is arranged downstream of the heating element 12 in the direction of flow of the air mass flow 10. This asymmetrical depositing of oil droplets 11 on the sensor element 15 gives rise to a signal drift, which ultimately brings about falsification of the absolute temperature detected by the sensor element 15, and therefore falsification of the measured value for the air mass flow 10. Furthermore, the depositing of the contamination preferably occurs in the edge region of the diaphragm 17. The asymmetrical depositing of the oil droplets 11 has physical reasons, which are caused, in particular, by the relatively high temperature in the region of the second sensor element 8 and the temperature gradient in the edge region of the diaphragm 17.

Figure 7:
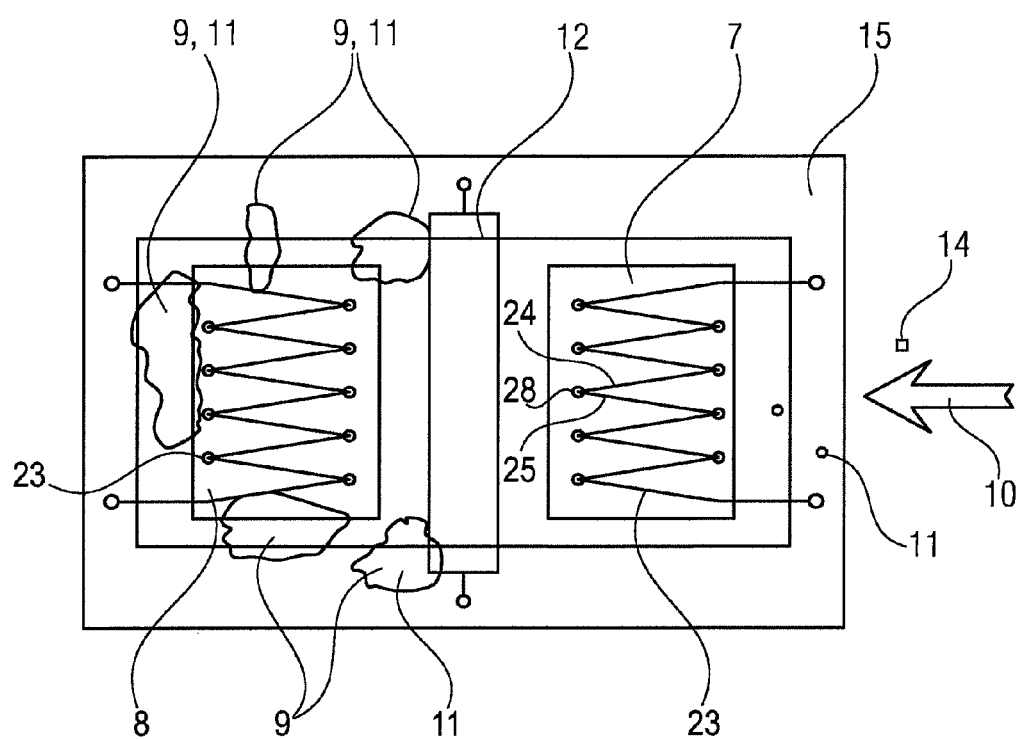
FIG. 7 shows the sensor element of an air mass meter with thermopiles.

FIG. 7 shows the sensor element 15 of an air mass meter 2. The first temperature sensor element 7 and the second temperature sensor element 8 of this sensor element 15 are embodied as thermopiles 23. Thermopiles 23, which are also referred to as thermal elements 23, convert heat into electrical energy. Thermal elements 23 consist of two different metals connected to one another at one end. A temperature difference generates an electrical voltage in the metal owing to the flow of heat.

The occurrence of a difference in electrical potential between two points on a conductor at different temperatures is referred to as the Seebeck effect. The difference in potential is approximately proportional to the difference in temperature and it depends on the conductor material. If the ends of a single conductor to measure are at the same temperature, the differences in potential always cancel one another out. However, if two different conductor materials are connected to one another, a thermal element 23 is produced. In the case of measuring systems based on the Seebeck effect, a very large number of individual thermal elements 23 are generally connected in series.

When selecting material pairs for measuring purposes, the highest possible generated thermal voltage should be achieved together with a high degree of linearity between the change in temperature and the change in voltage. The thermopiles 23 shown in FIG. 7 consist of a sequence of a respective first metal 24 which is connected at a connecting point 28 to a second metal 25.

In FIG. 7 it is clearly apparent that in the region of the second temperature sensor element 8, which is constructed from thermal elements 23, contamination 9 is deposited predominantly in the form of oil droplets 11. This contamination 9 brings about falsification of the absolute temperature measured by the temperature sensor elements 7 and 8. The resulting signal drift has already been mentioned in the description of the abovementioned figures.

Figure 8:
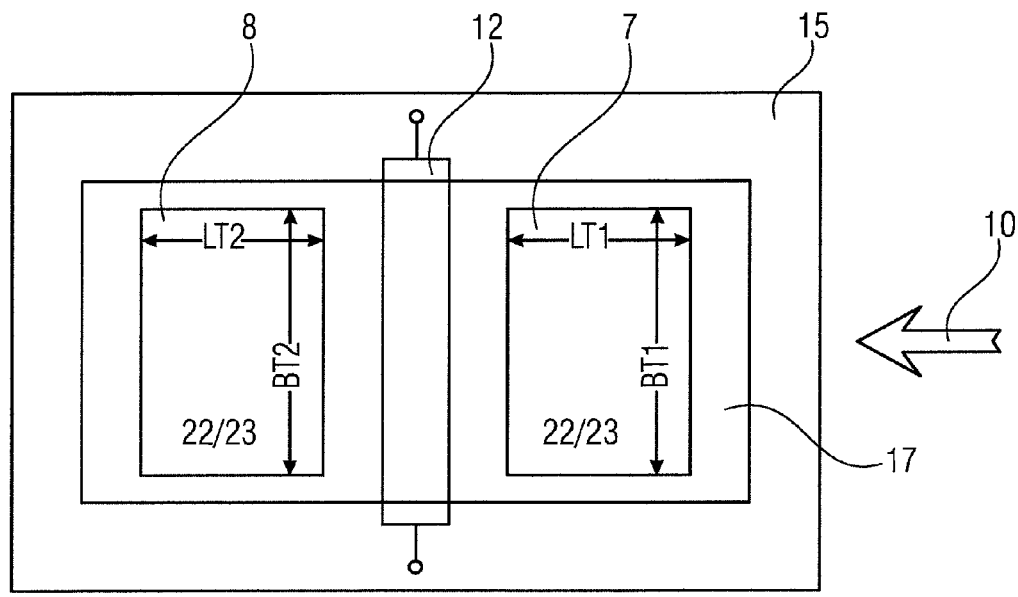
FIG. 8 shows the sensor element from the preceding figures.

FIG. 8 shows the sensor element 15 of the preceding figures. The sensor element 15 is embodied with a microelectromechanical design and has a first temperature sensor element 7 and a second temperature sensor element 8. The heating element 12 is arranged between the first temperature sensor element 7 and the second temperature sensor element 8. The first temperature sensor element 7, the second temperature sensor element 8 and the heating element 12 are embodied on a thin diaphragm 17. The first temperature sensor element 7 has a first width BT 1 and a first length LT 1. The second temperature sensor element 8 has a second width BT2 and a second length LT 2. In this example, the first length LT 1 of the first temperature sensor element 7 is, within the scope of the manufacturing tolerances, equal to the second length LT2 of the second temperature sensor element 8. The first width BT 1 of the first temperature sensor element 7 is also equal to the second widths BT2 of the second temperature sensor element 8 within the scope of the manufacturing tolerance. The first temperature sensor element 7 and the second temperature sensor element 8 can be embodied as measuring resistors 22 or thermopiles 23. The arrangement of the first temperature sensor element 7 and of the second temperature sensor element 8 on the thin diaphragm 17 is effected in an axially symmetrical fashion, where the heating element 12 forms the axis of symmetry for the two temperature sensor elements 7, 8.

Figure 9:
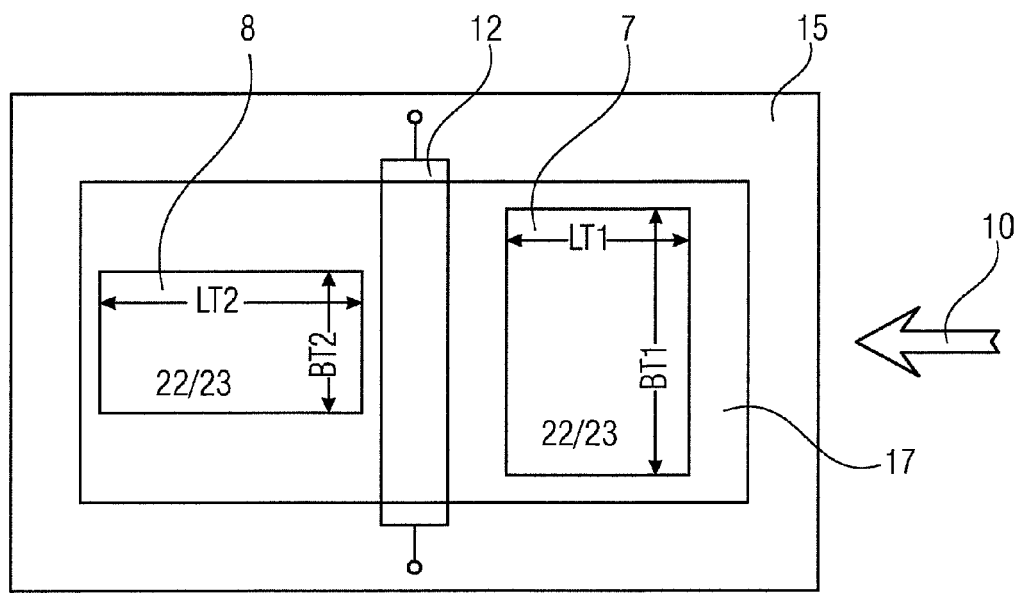
FIG. 9 shows an asymmetrical embodiment of the first temperature sensor element and of the second temperature sensor element.

FIG. 9 shows an asymmetrical embodiment of the first temperature sensor element 7 and of the second temperature sensor element 8 with respect to the axis of symmetry formed by the heating element 12. The temperature sensor element 15 shown in FIG. 9 corresponds largely to the temperature sensor element 15 shown in FIG. 8, where the first width BT 1 of the first temperature sensor element 7 is significantly greater than the second width BT 2 of the second temperature sensor element 8, however. In addition, in FIG. 9 the first length LT 1 of the first temperature sensor element 7 is substantially smaller than the second length LT 2 of the second temperature sensor element B. As a result of the different dimensioning of the first width BT 1 and of the second width BT 2, as well as of the first length LT 1 and of the second length LT 2 of the first temperature sensor element 7 and of the second temperature sensor element 8, the contamination-induced signal drift of the air mass meter 2 can be effectively suppressed, as a result of which the measurement results of the air mass meter 2 are available in a very stable fashion over a long time. The suppression of the signal drift in the case of the asymmetrically embodied sensor element is therefore successful because, for thermodynamic reasons, contamination 9 and, in particular, oil droplets 11, cannot accumulate in the edge region of the second temperature sensor element 8.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. An air mass meter (2) comprising:
   a sensor element (15) of a microelectromechanical type, the sensor element (15) having:
      a heating element (12);
      a first temperature sensor element (7) arranged upstream, with respect to a direction of air mass flow, of the heating element (12); and
      a second temperature sensor element (8) arranged downstream, with respect to the direction of air mass flow, of the heating element (12),
   wherein the first temperature sensor element (7) has a first width (BT1) and a first length (LT1), and the second temperature sensor element (8) has a second width (BT2) and a second length (LT2), wherein the first width (BT1) of the first temperature sensor element (7) is greater than the second width (BT2) of the second temperature sensor element (8).

2. The air mass meter (2) as claimed in claim 1, wherein the second length (LT2) of the second temperature sensor element (8) is greater than the first length (LT1) of the first temperature sensor element (7).

3. The air mass meter (2) as claimed in claim 1, wherein the first width (BT1) of the first temperature sensor element (7) is at least 10% greater than the second width (BT2) of the second temperature sensor element (8).

4. The air mass meter (2) as claimed in claim 2, wherein the second length (LT2) of the second temperature sensor element (8) is at least 10% greater than the first length (LT1) of the first temperature sensor element (7).

5. The air mass meter (2) as claimed in claim 1, wherein the first width (BT1) of the first temperature sensor element (7) is at least 30% greater than the second width (BT2) of the second temperature sensor element (8).

6. The air mass meter (2) as claimed in claim 2, wherein the second length (LT2) of the second temperature sensor element (8) is at least 30% greater than the first length (LT1) of the first temperature sensor element (7).

7. The air mass meter (2) as claimed in claim 1, wherein the first width (BT1) of the first temperature sensor element (7) is at least 50% greater than the second width (BT2) of the second temperature sensor element (8).

8. The air mass meter (2) as claimed in claim 2, wherein the second length (LT2) of the second temperature sensor element (8) is at least 50% greater than the first length (LT1) of the first temperature sensor element (7).

9. The air mass meter (2) as claimed in claim 1, wherein a product of the first width (BT1) and of the first length (LT1) of the first temperature sensor element (7) is equal to a product of the second width (BT2) and of the second length (LT2) of the second temperature sensor element (8).

* * * * *